US012736022B2

(12) United States Patent
Garcilazo Merino et al.

(10) Patent No.: US 12,736,022 B2
(45) Date of Patent: Sep. 15, 2026

(54) DESTRUCTIVE JOINT TESTING OF MEDIUM FILLED PORT FUEL INJECTION RAILS

(71) Applicant: Robert Bosch GmbH, Stuttgart (DE)

(72) Inventors: Aram Aminadab Garcilazo Merino, San Luis Potosi (MX); Pablo Vazquez Langle Nieto, Toluca (MX)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 19/066,679

(22) Filed: Feb. 28, 2025

(65) Prior Publication Data

US 2026/0258772 A1 Sep. 3, 2026

(51) Int. Cl.

*F02M 55/00* (2006.01)
*F02M 55/02* (2006.01)
*F02M 61/16* (2006.01)
*F02M 65/00* (2006.01)
*F02M 69/46* (2006.01)

(52) U.S. Cl.

CPC ........ *F02M 55/025* (2013.01); *F02M 61/166* (2013.01); *F02M 65/00* (2013.01); *F02M 69/465* (2013.01)

(58) Field of Classification Search

CPC ....... F16L 47/02; F16L 58/181; F16L 58/188; F16L 13/002; F16L 13/02; F02M 55/025; F02M 55/02; F02M 61/166; F02M 61/168; F02M 65/00

See application file for complete search history.

(56) References Cited

U.S. PATENT DOCUMENTS 4,913,119 A * 4/1990 Usui .................... F02M 69/465 123/456
5,709,948 A * 1/1998 Perez ...................... C08L 63/00 525/107
8,020,897 B2 * 9/2011 Katayama ........... F16L 33/2076 285/915

(Continued)

FOREIGN PATENT DOCUMENTS

WO WO-2010103772 A1 * 9/2010 ........... B23K 20/227

*Primary Examiner* — George C Jin
*Assistant Examiner* — Teuta B Holbrook
(74) *Attorney, Agent, or Firm* — Maginot, Moore & Beck LLP

(57) ABSTRACT

The innovation set forth in this patent application encompasses a series of procedures and testing methods related to port fuel injection rail assemblies and the application of liquid epoxy to enhance mechanical stability and rigidity during testing. The claims cover a port fuel injection rail assembly test procedure involving the application of liquid epoxy to the inner port fuel injection rail chamber, curing, and subsequent rigidity testing of brazed joints. Additionally, the specification details specific components, materials, and testing parameters, including mechanical pulsation testing, cross-cutting procedures, and fatigue test simulations. This disclosure reflects a comprehensive approach to evaluating the robustness and performance of port fuel injection rail assemblies, particularly focusing on the application of liquid epoxy and mechanical testing methods to ensure the integrity and reliability of the testing of the brazed joints within the port fuel injection rail assembly.

20 Claims, 3 Drawing Sheets

(56) References Cited

U.S. PATENT DOCUMENTS

| | | | | |
|---|---|---|---|---|
| 2007/0235566 | A1* | 10/2007 | Hou | C10L 10/06 44/415 |
| 2009/0145504 | A1* | 6/2009 | Colletti | F02M 55/025 123/469 |
| 2018/0023157 | A1* | 1/2018 | Hayashi | C22C 38/02 428/544 |

* cited by examiner

DESTRUCTIVE JOINT TESTING OF MEDIUM FILLED PORT FUEL INJECTION RAILS

TECHNICAL FIELD

This disclosure relates to the technical field of port fuel injection rail (PFI) assemblies and testing methods for evaluating the mechanical stability and rigidity of brazed or welded joints within port fuel injection rail assemblies, particularly focusing on the application of filling the port fuel injection rail with liquid epoxy, curing the epoxy, and mechanical testing methods to ensure the integrity and reliability of the port fuel injection rail assemblies.

BACKGROUND

A port fuel injection rail assembly is an important component in a fuel injection system, responsible for delivering pressurized fuel from the fuel pump to the fuel injectors in an internal combustion engine. The port fuel injection rail assembly maintains a substantially consistent pressure to ensure precise and uniform fuel delivery to the injectors. During operation, port fuel injection rails are subjected to internal pressures from the fuel held inside and this pressurized fuel provides additional stability and rigidity. However, traditional testing methods involving empty port fuel injection rails do not accurately reflect the mechanical behavior of the assembly under real-world conditions. This discrepancy in testing conditions has prompted the need for innovative approaches to simulate the internal pressure the fuel would provide and enhance the mechanical stability of port fuel injection rail assemblies during testing, ultimately ensuring their reliability and performance in practical usage scenarios.

SUMMARY

One aspect of this disclosure is directed to a port fuel injection rail assembly test procedure that comprises taking a port fuel injection rail assembly and filling the inner port fuel injection rail chamber with liquid epoxy. The port fuel injection rail assembly in this test procedure has a main body tube defining an inner port fuel injection rail chamber and a number of components brazed onto the main body tube, each connection between defining a number of brazed joints. Upon the liquid epoxy curing, performing a rigidity test on at least one of the brazed joints. The cured epoxy provides improved rigidity to the port fuel injection rail assembly, similar to that of pressurized fuel that would be inside the port fuel injection rail during operation, and thusly provides for more reliable real-world like test results.

This aspect of the disclosure may also be relevant when some of the components are of the same material as the main body tube, especially when the components and the main body tube are steel or stainless steel, although other materials maybe used. And additionally interesting is when some of the components are brazed or welded onto the main body tube using copper, especially when it is copper high temperature welding.

With this aspect, some of the components brazed onto the main body tube are injector cups, the injector cups protruding from the main body and having an inner injector cup chamber in fluid communication with the port fuel injection rail chamber, and during the step of filling the inner port fuel injection rail chamber with liquid epoxy, the inner injector cup also fills with liquid epoxy. The injector cups provide fluid communication, and often an attachment point, for the fuel injectors with the inner port fuel injection rail chamber. Alternatively, however, some of the components brazed onto the main body tube are attachment flanges. Attachment flanges allow the fuel injector assembly to be mounted and held in position on an engine.

With this aspect of the disclosure, the rigidity test on the brazed joints may be a mechanical pulsation test. The mechanical pulsation test may be imparted onto the brazed component at a load of 1.5 kN with a start distance of 0.35 mm, and a frequency of 76.010 Hz.

To aid in the testing of these port fuel injection rail assemblies, it may be beneficial to section the assembly into smaller segments, thus to maintain real-world similarity to a pressurized port fuel injection rail, the test procedure may, after the step of allowing the liquid epoxy to cure, further comprising the step of cross-cutting through the main body tube to isolate a section of the port fuel injection rail assembly and performing the rigidity test of at least one of the number of brazed joints from the isolated section along with the segment of cured epoxy disposed therein. The cured epoxy may be especially helpful when the main body tube has a square or rectangular cross-section, as the cutting of an empty tube can deform the tube. The cured epoxy now simulates a pressurized segment of the port fuel injection rail assembly which could not be performed with actual liquid fuel, as the assembly being sectioned would not hold the liquid (and such cutting and testing with fuel involved would be excessively difficult).

Another aspect of this disclosure is directed to a port fuel injection rail assembly brazed joint test procedure. In this procedure, a port fuel injection rail assembly inner port fuel injection rail chamber is filled with a liquid medium. In this aspect, the port fuel injection rail assembly has a metal main body tube defining an inner port fuel injection rail chamber and a number of metal components brazed onto the main body tube, each connection between defining a brazed joint. Upon the curing of the medium, cross-cutting the main body tube in at least one location to section the port fuel injection rail assembly into a smaller segment containing at least one brazed joint. And then performing a mechanical pulsation test on the at least one brazed joint from the smaller segment. The medium may be fast curing epoxy that cures into a solid form at room temperature.

This aspect may also include wherein some of the components brazed onto the main body tube are injector cups. The injector cups may protrude from the main body and have an inner injector cup chamber in fluid communication with the port fuel injection rail chamber. In this case, then, during the step of filling the inner port fuel injection rail chamber with liquid epoxy, the inner injector cup would also fill with liquid epoxy.

In this aspect, the brazed joint having the mechanical pulsation test performed may be a copper brazing and the main body tube and component may be stainless steel. Additionally, the test procedure mechanical pulsation test may be run at a load between of 0.5 kN and 2.5 kN, with a start distance between 0.25 mm and 0.45 mm, and a frequency between 66 Hz and 86 Hz.

A further aspect of this disclosure is directed to yet another port fuel injection rail assembly test procedure. In this further aspect, a port fuel injection rail assembly is also filled with curable medium. In this aspect, the port fuel injection rail assembly has a substantially quadrilateral metallic main body tube running longitudinally and defining an inner port fuel injection rail chamber. Additionally, at least one metallic component is brazed onto the main body tube, the connection between defining a joined joint. Upon allowing the curable medium to cure, this aspect teaches cutting through the main body tube and the cured medium substantially orthogonally to the longitudinal direction at least once to isolate a smaller section of the port fuel injection rail assembly with the joined joint. Once that is completed, fixing the smaller section of the port fuel injection rail assembly into a vice-like fixture to hold the smaller section, and attaching the component of the isolated smaller section to a mechanical pulsation device to input mechanical pulsations into the component relative to the fixed section of the port fuel injection rail assembly to test the robustness of the joined joint.

In this aspect, the main body tube and component may both be made of stainless steel and the brazing may be copper. Additionally, the inputted pulsations may be at a frequency of 76+/−10 Hz, the inputted pulsations travel may be at a distance of 0.35+/−10 mm in the longitudinal direction of the port fuel injection rail, and the inputted pulsations may be at a load of 1.5+/−0.5 kN. To wrap this all up, the test procedure may include performing a fatigue test simulation and correlating the results of the number of cycles to failure of joined joint from the inputted mechanical pulsations with that of the fatigue test simulation.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
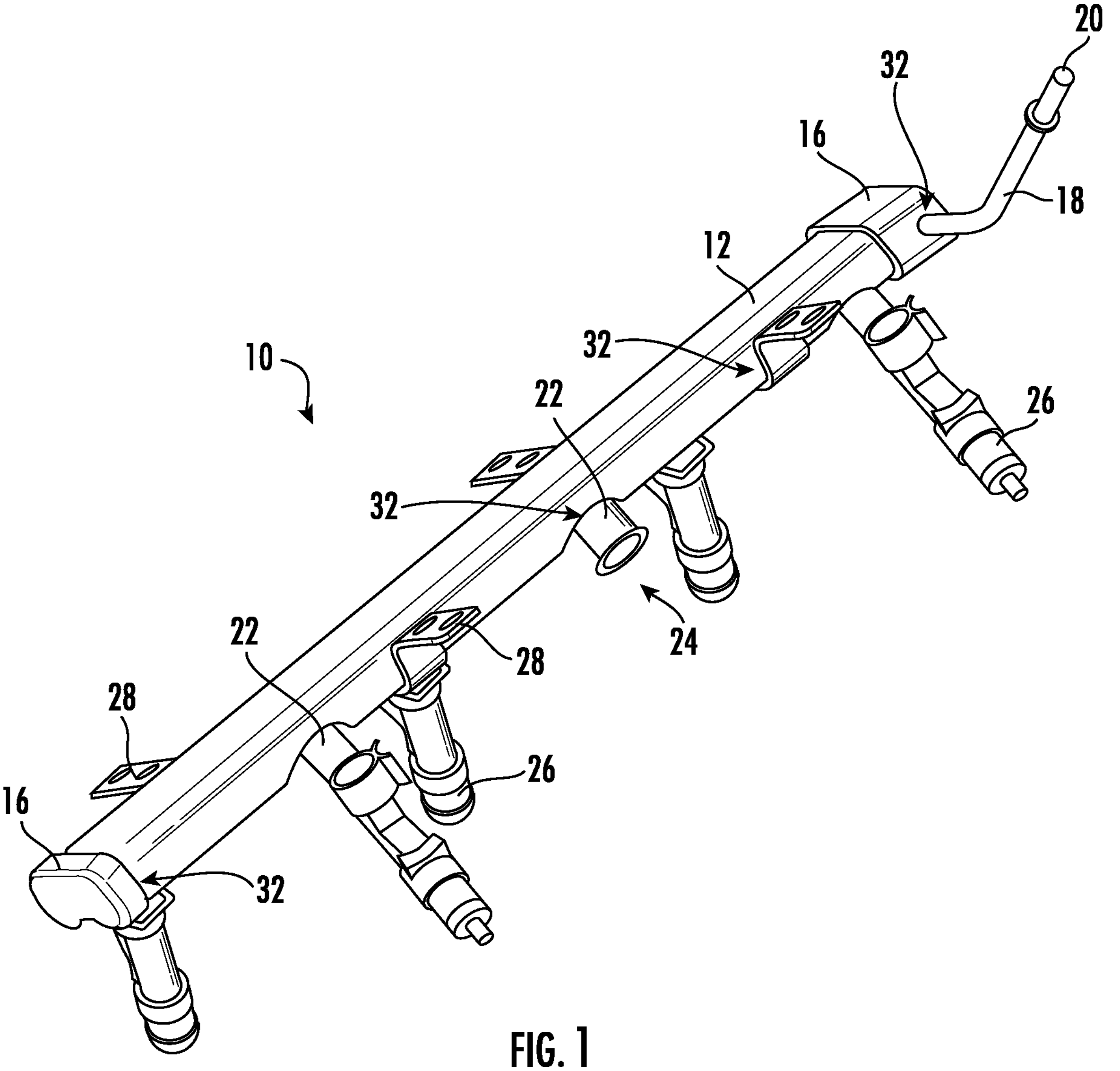
FIG. 1 is a perspective view of a port fuel injection rail assembly.

FIG. 1 shows a port fuel injection rail assembly 10 with a main body 12 consisting mostly of a straight hollow metal tube, typically made of steel or stainless steel, although other materials, such as, but not limited to, other steel alloys, titanium alloys, nickel alloys, copper alloys, brass, bronze, nickel-silver, and aluminum may be used. The cross-section of the main body tube 12 shown here is square or rectangular in shape (best seen in FIG. 2), or otherwise referred to as quadrilateral in shape running longitudinally along the port fuel injection rail assembly 10, but many other geometric shapes, such as circles and ovals, may be used. The main body tube 12 defines an inner port fuel injection rail chamber 14 (see FIG. 2). The main body tube 12 shown here is capped at both ends with end caps 16. The caps 16 are welded or brazed onto the ends of the main body tube. An inlet tube 18, or fuel inlet line 18, typically a smaller diameter tube made from the same metal material as the main body 12, protrudes from the main body 12. The inlet tube 18 defines an inlet tube interior 20 and in assembly is in fluid communication with the inner port fuel injection rail chamber 14. The inlet tube 18 may be connected to the main body 12 or one of the caps 16. The cross-section of the inlet tube 18 is shown here circular in shape. The inlet tube 18 is where fuel enters the main body tube 12 of the port fuel injection rail 10. This inlet tube 18 is welded or brazed to the main body tube.

The port fuel injection rail 10 also has a number of injector cups 22. Each injector cup 22 protrudes from the main body tube 12 with the interior of the injector cup, also known as an inner injector cup chamber 24, being in fluid communication with the interior 14 of the main body tube 12. The injector cup 22 defines the injector cup chamber 24. The injector cups 22 are typically smaller in diameter than the main body tube 12, made from the same metal material as the main body 12, and are welded or brazed onto the main body tube 12. Injector cup 22 cross sections are generally more circular in shape. The injector cups 22 are designed to fluidly connect with fuel injectors 26, or additional tubing ending in fuel injectors 26, which when actuated inject fuel from the port fuel injection rail into a combustion chamber of an engine (not shown).

The port fuel injection rail 10 also has attachment flanges 28 protruding from the main body 12. Attachment flanges 28 are made from the same material as the main body 12 but are not in fluid communication with the interior of the main body tube 12. Attachment flanges 28 are used to attach and hold the port fuel injection rail in position proximate an engine when in use (not shown). The attachment flanges 28 are also welded or brazed to the main body 12.

The end caps 16, inlet tube 18, injector cups 22, and attachment flanges 28 are all components 16, 18, 22, 28 of the port fuel injection rail assembly 10. As shown and described above, each component 16, 18, 22, 28 in this figure is made of the same material as the port fuel injection rail main body 12 and is brazed on to the main body 12.

In this embodiment, for brazing, copper is used, and more specifically, high temperature copper welding is utilized. The copper brazing between the components 16, 18, 22, 28 and the main body tube 12 is defined as a brazed joint 32. Said another way, a brazed joint 32 is at least partially disposed between a component 16, 18, 22, 28 and main body 12. The brazing of the components 16, 18, 22, 28 to the port fuel injection rail main body 12 in this innovation is performed with high temperature copper welding. Brazing is a joining process, and other joining processes such as, but not limited to, welding, soldering, and adhesive bonding are contemplated. Additionally, other brazing alloys are contemplated, such as, but not limited to, silver-based alloys, nickel-based alloys, aluminum-based alloys, zinc-based alloys, and copper-phosphorus alloys. With any chosen brazing material, operating temperatures, corrosion resistance, mechanical properties, compatibility, and wetting and flow characteristics of the brazing material with the connecting materials are to be taken into account.

When designing a port fuel injection rail 10, engineering must optimize the joining process for optimal robustness of the port fuel injection rail 10 in use. To do so, some destructive testing is performed on a sample of manufactured port fuel injection rails. To test the joined joints 32 (the locations where the caps 16, inlet tube 18, injector cups 22, or attachment flanges 28 connect to the main body 12), the joined joints 32 may be tested in the entire assembly 10, or the main body 12 may be sectioned into smaller sections 34 of the main body 12 with one or a few of the components 16, 18, 22, 28 which can then be placed into a mechanical rigidity test machine 40 (see FIG. 3).

Brazing is a metal-joining process in which a filler metal is heated above its melting point and distributed between two or more close-fitting parts by capillary action. The filler metal is brought slightly above its melting temperature while the workpieces remain below their melting temperatures. Once the filler metal cools, it forms a strong, permanent bond between the workpieces. High-temperature copper brazing specifically involves the use of copper-based filler metals that have a higher melting point, typically above 800° C. (1472° F.). This process is commonly used for joining metals such as steel and stainless steel.

Brazing is like some forms of welding in that it creates a strong bond between metal components. However, unlike welding, brazing does not melt the base metals being joined. Instead, it relies on the capillary action of the molten filler metal to create the bond. This results in a joint that is often stronger than the base metals themselves, with minimal distortion and heat-affected zones. However, many in the industry may improperly refer to brazing and welding as interchangeable terms, and the test procedures disclosed herein would be equally effective on welded components.

In the context of manufacturing and engineering, the term joining or joined is used to describe the broad category of processes that create a permanent bond between materials. This can include the use of heat, pressure, or adhesives to achieve the desired bond. By using the term joining, it allows for a comprehensive discussion of various methods used to connect materials, including both brazing and welding.

Joining or joined, in this disclosure, would not include mechanical connections utilizing mechanical fasteners such as screws, bolts, or pop-rivets, however if a combination connection occurs with a mechanical fastener and a joined joint, the test procedure would still be useful for the joined joint aspect of the connection.

A failure of a joined joint, including a copper brazing, can occur under various conditions and stress factors. Some common factors that may lead to the failure of a brazed joint include: (1) Insufficient Bond Strength: If the brazing process does not achieve adequate bonding between the base metals and the filler metal, it can result in a weak joint that is susceptible to failure under mechanical or thermal stress. (2) Overloading: Excessive mechanical loads or stress beyond the design limits of the joint can cause the brazed joint to fail. This may include tensile, compressive, or shear forces that exceed the strength of the joint. (3) Thermal Cycling: Repeated exposure to thermal cycling, including rapid heating and cooling, can lead to fatigue and failure of the brazed joint due to the differential expansion and contraction of the base metals and the filler metal. (4) Corrosion: Exposure to corrosive environments can degrade the integrity of the brazed joint over time, leading to weakening and failure. (5) Brittle Fracture: In some cases, the brazed joint may exhibit brittle fracture behavior, especially if the joint design or material selection does not account for potential stress concentrations or brittleness in the joint area. (5) Manufacturing Defects: Inadequate process control during the brazing operation, such as improper cleaning, flux application, or heating, can result in defects that compromise the integrity of the joint.

The primary focuses of the testing performed in this disclosure is to ensure the manufacturing process does not have an insufficient bond strength, that the normal vibrations found in-use on an engine would not overload the brazing joints, that there wouldn't be a brittle fracture due to poor materials used during manufacturing, and to identify any manufacturing defects, especially those not seen in the assembly fatigue test simulations.

It's important to consider these factors and ensure that brazed/joined joints are designed, processed, and inspected to meet the specific requirements and performance expectations of the intended application. Regular testing and quality control measures can help identify potential issues and prevent brazed joint failures, and this disclosure teaches a novel way to do so.

Other fuel injector assembly devices, such as a pressure regulator or pressure sensor (not shown), may be attached to the main body 12 via components brazed on to the main body 12, such as a pressure regulator cup (not shown) or pressure sensor port (not shown). A pressure regulator cup (not shown) provides attachment of a pressure regulator to the port fuel injection rail 10 and holds a pressure regulator in fluid communication with the inner port fuel injection rail chamber 14. The pressure regulator cup may be made of the same material as the main body 12 and may be connected to the main body 12 by a brazed joint 32. A pressure regulator may be used to maintain a constant fuel pressure within the system by controlling how much fuel flows through it at any given time. If equipped, it helps maintain consistent levels of power output throughout different operating conditions and prevents too much or too little fuel from entering any one-cylinder port fuel (not shown) at any given moment.

The port fuel injection rail 12 and components 16, 18, 22, 28 shown here are made of steel or stainless steel tubing that has been machined and formed into specific mating shapes. The overall assembly 10 will take a form that will fit over the heads of the engine's cylinders (not shown). It is important that port fuel injection rails are made with precision because if they are not, then the amount of fuel delivered to the cylinders ports can be uneven, resulting in inefficient combustion in some areas. Port fuel injection rails have several small openings along them which act as passageways for pressurized fuel from the main supply line to reach each cylinder, here shown as injector cups 22. Maintaining sealed brazings or welds between the main body 12 of the port fuel injection rail 10 and the components 16, 18, 22, 28 providing the passageways is important for the proper operation of a port fuel injection rail assembly. However, testing of an empty port fuel injection rail 10 would not provide the same rigidity and robustness as a pressurized port fuel injection rail 10 when on the vehicle.

Figure 2:
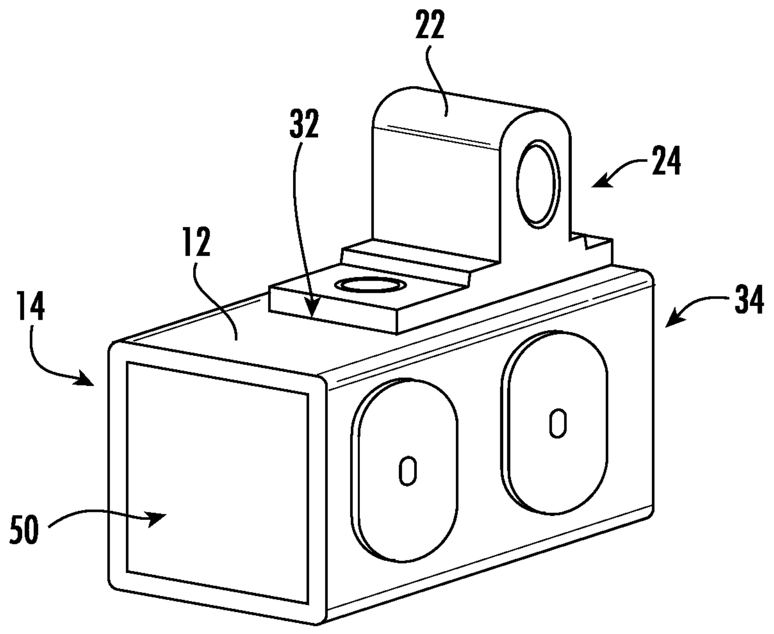
FIG. 2 is a diagrammatic illustration of a cross-cut section of a port fuel injection rail with cured epoxy in the inner chamber.

FIG. 2 shows a section 34 of the main body 12 with at least one component 22 attached to the main body 12 by a brazed joint 32. This section 34 was created by cross-cutting the main body tube 34. In this figure, a medium 50 is shown disposed in the inner port fuel injection rail chamber 14. The medium 50 is a fast-curing liquid epoxy 50. The medium 50 is in liquid form to fill the inner port fuel injection rail chamber 14 and any components 16, 18, 22 having fluid communication with the inner chamber 14, and then the medium cures into a solid at room temperature to become a cured epoxy 50 as seen in the figure. Other mediums and curing process could be utilized, such as the addition of a second medium which interacts with the first medium to solidify. The fast cure liquid epoxy 50 used with this innovation is Extec Fast Cure Epoxy Hardener product/catalogue number 14732 or 14733. This epoxy 50 is a low viscosity, two component, clear, chemical resistant casting resin that gels at room temperature, and exhibits low shrinkage and superior adhesion.

Epoxy refers to a type of polymer that is created through the chemical reaction between an epoxide resin and a polyamine hardener. This reaction results in a thermosetting polymer with a wide range of applications. Epoxy resins are known for their strong adhesive properties, chemical resistance, and durability. They are commonly used as adhesives, coatings, and sealants in various industries, including construction, automotive, aerospace, and electronics. Epoxy resins can be formulated to have different viscosities, cure times, and mechanical properties, making them versatile for a wide range of applications. When combined with a hardener, epoxy resins undergo a curing process that results in a strong and durable material with excellent bonding and protective qualities.

A polymer is a large molecule composed of repeating structural units, or monomers, that are covalently bonded together to form a long chain. These repeating units give polymers their characteristic properties, such as strength, flexibility, and durability. Polymers can be found in a wide range of natural and synthetic materials, including plastics, rubber, fibers, and biological macromolecules such as DNA and proteins. Polymers can be tailored to exhibit specific properties and behaviors, making them valuable for a wide range of applications, from everyday consumer products to advanced industrial materials.

Although many mediums could be used, another polymer medium anticipated by this disclosure is the use of an acrylic. Acrylics, also known as poly(methyl methacrylate) or PMMA, are transparent thermoplastics that are commonly used as a lightweight and shatter-resistant alternative to glass. Acrylics are known for their optical clarity, weather resistance, and versatility in various applications. It can be molded, machined, or formed into various shapes, making it a popular material in both industrial and consumer settings. Additionally, acrylic is available in various forms, including sheets, rods, and tubes, and it can be easily colored, molded, or bonded to create a wide range of products.

Figure 3:
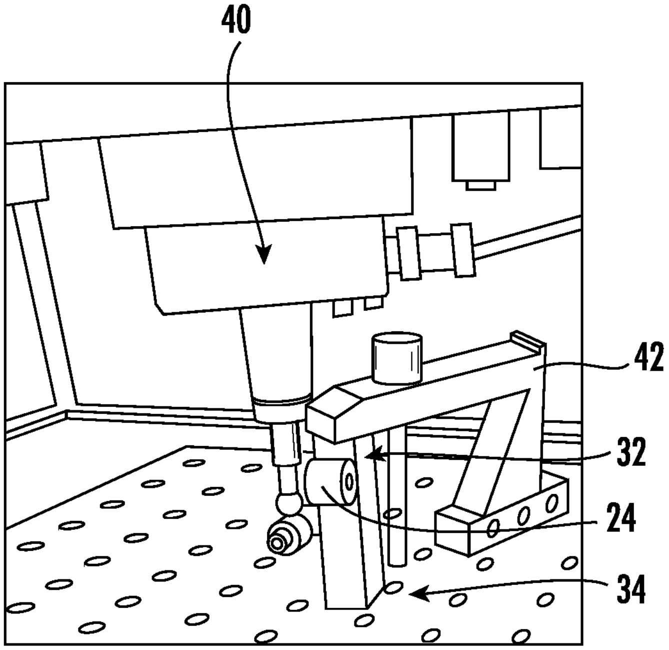
FIG. 3 is a diagrammatic illustration of a section of a port fuel injection rail with cured epoxy in the inner chamber in a mechanical pulsation test machine.

FIG. 3 shows a section 34 of the main body 12 in a mechanical rigidity test machine 40. The mechanical rigidity test machine 40 is shown holding the section 34 of the main body and imparts a mechanical pulsation into the component 24. The test equipment used in this process is a SincoTec 30KN machine, with a load of 1.5 kN, a distance of 0.35 mm, and a frequency of 76.010 Hz. All of this is done to ensure the brazing joint 32 is adequate for when the port fuel injection rail is used in the real world. The problem solved with this innovation is two-fold. One, when sectioning the main body 12 of the port fuel injection rail 10, the structure may become deformed, and the epoxy 50 helps to maintain original shape. Also, when on the test rig, an empty main body 12 would not have the same stiffness as when pressurized with fuel and may flex and deform. In both cases, this would not represent real world conditions, as in actual use the port fuel injection rail would be pressurized adding additional stability and robustness for the structure. Adding the fast-curing liquid epoxy 50 inside the low-pressure port fuel injection rails body 12 solves this problem, both when sectioning the body and when testing.

The section 34 of the main body 12 is shown here fixed in position in a vice-like fixture 42. The test machine 40 is attached to the component 24 of the isolated smaller section 34. The test machine 40 is a mechanical pulsation device used to input mechanical pulsations into the component 24 relative to the fixed section 34 of the port fuel injection rail assembly to test the robustness of the brazed joint 32. The mechanical pulsation test in the disclosed solution was run at a load of 1.5 kN, but other loads may be uses. Other loads may be between of 0.5 kN and 2.5 kN or 1.5+/−0.5 kN. The mechanical pulsation test in the disclosed solution had a start distance of 0.35 mm, but other start distances may be used, such as between 0.25 mm and 0.45 mm, or 0.35+/−10 mm. The mechanical pulsation test in the disclosed solution was run at a frequency of 76.010 Hz, but other frequencies may be used, such as between 66 Hz and 86 Hz, or 76+/−10 Hz. The distance and load may also be imparted to the component in the longitudinal direction of the port fuel injection rail, although other directions may also be used. The mechanical pulsation test was performed on a SincoTec 30 kN resonance system.

Utilizing the SincoTec 30 kN resonance system at the parameters mentioned above, along with the Extec Fast Cure Epoxy Hardener product/catalogue number 14732, and a segment 34 of the port fuel injection rail assembly 10 as shown in FIG. 2, resulted in a cyclic duration of 10,000,045 cycles, which correlated with the number of cycles to failure determined in a fatigue test simulation of the brazed joint on a vehicle.

Figure 4:
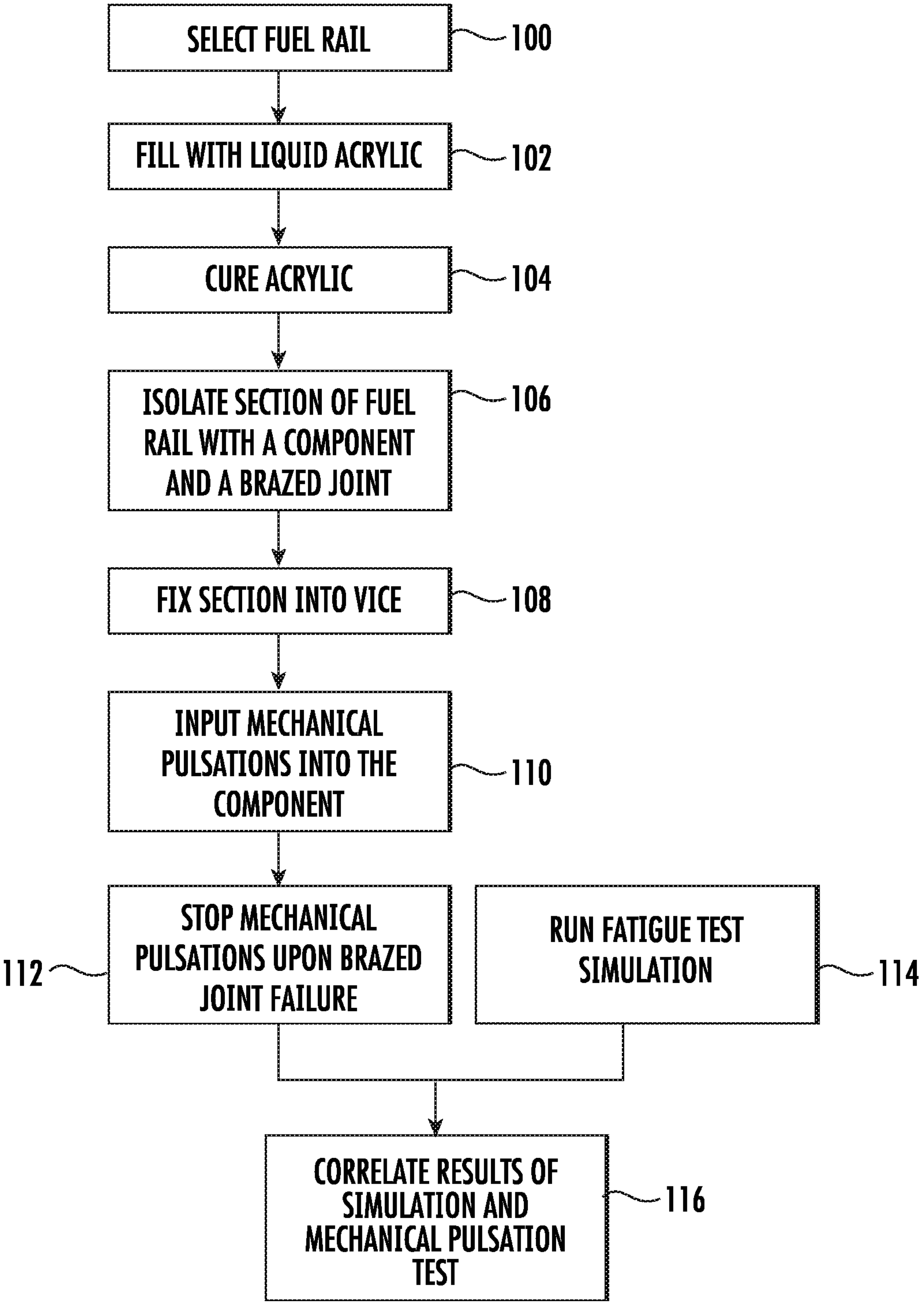
FIG. 4 is a flowchart illustrating an example of a disclosed test procedure.

FIG. 4 is a flowchart illustrating an example of a disclosed test procedure. Step 100 of the test procedure is obtaining a port fuel injection rail assembly that has components brazed to the main body. Step 102 is filling the inner port fuel injection rail chamber with liquid epoxy. If the port fuel injection rail assembly has an injector cup, then during step 102, the inner injector cup also fills with liquid epoxy. Step 104 is allowing the liquid epoxy to cure. Epoxy that cures at room temperature is recommended. Step 106 is cross-cutting through the main body tube, along with the cured epoxy, to isolate a section of the port fuel injection rail assembly containing at least one brazed joint. This cross-cut may be done substantially orthogonally to a longitudinal direction of the port fuel injection rail assembly. Step 108 is fixing the smaller section of the port fuel injection rail assembly, along with the portion of cured epoxy located therein, into a vice-like fixture to hold the smaller section. Step 110 is attaching a mechanical pulsation device to the component of the isolated smaller section and inputting mechanical pulsations into the component relative to the fixed section of the port fuel injection rail assembly to test the robustness of the brazed joint. This is referred to as a rigidity test of at least one of the number of brazed joints.

The mechanical pulsation test on the respective component of the brazed joint may be run at a load of 1.5 kN, although other loads may be used. Other loads may be between of 0.5 kN and 2.5 kN, or 1.5+/−0.5 kN. The mechanical pulsation test on the respective component of the brazed joint may have an operational distance of 0.35 mm, although other distances of travel may be used. Other travel distances may be between 0.25 mm and 0.45 mm, or 0.35+/−10 mm. The mechanical pulsation test on the respective component of the brazed joint may be run at a frequency of 76.010 Hz, although other frequencies may be used. Other frequencies may be between 66 Hz and 86 Hz, or 76+/−10 Hz. These parameters may be similar to those found in actual usage on an engine. In this disclosure, the mechanical pulsation test was performed on a SincoTec 30 kN resonance system.

Step 112 is stopping the test, or said another way, running the mechanical pulsation test until the brazed joint fails and recording the number of cycles occurring until failure.

Step 114 is performing a fatigue test simulation. Fatigue testing simulations are conducted using computer-aided engineering (CAE) software. Fatigue testing simulations involve the use of computational models to predict the behavior of materials and components under cyclic loading conditions, such as repeated stress or strain. These simulations can provide valuable insights into the durability, performance, and potential failure modes of materials and structures. In fatigue testing simulations, CAE software is used to apply complex loading conditions and analyze the response of the material or component over numerous loading cycles. The software can predict factors such as stress concentrations, crack initiation and propagation, and the overall fatigue life of the material or component. The simulation may be performed at any time prior to or during any of the previous disclosed steps.

The simulation may be performed with any well know CAE software such as finite element analysis (FEA) software utilizing the computer aided design (CAD) drawings and selected material properties of the selected port fuel injection rail assembly, or other known ways. Step 116 is correlating the results of the number of cycles to failure of brazed joint from the inputted mechanical pulsations with that of the fatigue test simulation. If step 116 is successful, and the actual joint failure results correlate with the simulation, then step 116 may be omitted and steps 100 thru 112 may be run at varying times during production to sample the brazing joints and maintain quality in operational excellence.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A port fuel injection rail assembly test procedure, comprising:

filling an inner port fuel injection rail chamber of a port fuel injection rail assembly with epoxy in liquid state, wherein the port fuel injection rail assembly has a main body tube defining the inner port fuel injection rail chamber, and a number of components brazed onto the main body tube, each connection between defining a number of brazed joints;

curing the epoxy to provide improved structural rigidity of the port fuel injection rail assembly; and performing a rigidity test on at least one of the number of brazed joints.

2. The test procedure of claim 1, wherein some of the number of components are of the same material as the main body tube.

3. The test procedure of claim 1, wherein some of the number of components and the main body tube are steel or stainless steel.

4. The test procedure of claim 1, wherein some of the number of brazed joints are copper.

5. The test procedure of claim 1, where some of the number of components brazed onto the main body tube are injector cups, the injector cups protruding from the main body and having an inner injector cup chamber in fluid communication with the port fuel injection rail chamber, and during the step of filling the inner port fuel injection rail chamber with liquid epoxy, the inner injector cup fills with liquid epoxy.

6. The test procedure of claim 1, where some of the number of components brazed onto the main body tube are attachment flanges.

7. The test procedure of claim 1, wherein the step of performing a rigidity test on at least one of the numbers of brazed joints comprises performing a mechanical pulsation test on the respective component of the brazed joint.

8. The test procedure of claim 7, wherein the mechanical pulsation test is run at a load of 1.5 kN with a start distance of 0.35 mm, and a frequency of 76.010 Hz.

9. The test procedure of claim 1, after the step of curing the epoxy, further comprising the step of cross-cutting through the main body tube to isolate a section of the port fuel injection rail assembly and performing the rigidity test of at least one of the number of brazed joints from the isolated section.

10. The test procedure of claim 1, wherein the main body tube has a square or rectangular cross-section.

11. A port fuel injection rail assembly brazed joint test procedure, comprising:

filling an inner port fuel injection rail chamber of a port fuel injection rail assembly with a liquid medium, wherein the port fuel injection rail assembly has a metal main body tube defining the inner port fuel injection rail chamber and a number of metal components brazed onto the main body tube, each connection between defining a brazed joint;

curing the medium;

cross-cutting the main body tube in at least one location to section the port fuel injection rail assembly into a smaller segment containing at least one brazed joint; and performing a mechanical pulsation test on the at least one brazed joint from the smaller segment.

12. The port fuel injection rail assembly brazed joint test procedure of claim 11, wherein the medium is a fast cure epoxy.

13. The port fuel injection rail assembly brazed joint test procedure of claim 11, wherein the medium cures at room temperature.

14. The port fuel injection rail assembly brazed joint test procedure of claim 11, wherein the mechanical pulsation test is run at a load between of 0.5 kN and 2.5 kN with a start distance between 0.25 mm and 0.45 mm, and a frequency between 66 Hz and 86 Hz.

15. A method of testing a brazed joint on a port fuel injection rail assembly, comprising:

filling an inner port fuel injection rail chamber of a port fuel injection rail assembly with a curable medium while in liquid state, wherein the port fuel injection rail assembly has a metallic main body tube running longitudinally defining the inner port fuel injection rail chamber, and at least one metallic component joined onto the main body tube, the connection between defining a joined joint;

curing the medium into a substantially solid state;

cutting through the main body tube and the cured medium substantially orthogonally to the longitudinal direction to isolate a smaller section of the port fuel injection rail assembly with at least one joined joint;

fixing the smaller section of the port fuel injection rail assembly into a vice-like fixture to hold the smaller section;

attaching the corresponding component of the at least one joined joint of the isolated smaller section to a mechanical pulsation device to input mechanical pulsations into the component relative to the fixed section of the port fuel injection rail assembly to test the robustness of the joined joint; and operating the mechanical pulsation device until the joined joint fails.

16. The method of claim 15, wherein the main body tube and component are both stainless steel and the brazing is copper.

17. The method of claim 15, wherein the inputted pulsations are at a frequency of 76+/−10 Hz.

18. The method of claim 15, wherein the inputted pulsations travel a distance of 0.35+/−10 mm.

19. The method of claim 15, wherein the inputted pulsations are at a load of 1.5+/−0.5 kN.

20. The method of claim 15, further comprising performing a fatigue test simulation, and correlating the results of the number of cycles to failure of brazed joint from the inputted mechanical pulsations with that of the fatigue test simulation.

* * * * *